(12) United States Patent
Espy et al.

(10) Patent No.: US 11,868,772 B2
(45) Date of Patent: Jan. 9, 2024

(54) HETEROGENEOUS MEMORY MANAGEMENT AND SERVICES

(71) Applicant: Red Hat, Inc., Raleigh, NC (US)

(72) Inventors: James W. Espy, Westford, MA (US); Jeffrey A. Brown, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 219 days.

(21) Appl. No.: 16/742,547

(22) Filed: Jan. 14, 2020

(65) Prior Publication Data

US 2021/0216320 A1    Jul. 15, 2021

(51) Int. Cl.
*G06F 9/30* (2018.01)

(52) U.S. Cl.
CPC ................................ *G06F 9/30043* (2013.01)

(58) Field of Classification Search
CPC ............. G06F 9/30043; G06F 12/0817; G06F 12/023; G06F 12/109; G06F 12/1072; G06F 2212/657; G06F 2212/1016; G06F 2212/7208; G06F 2212/1044; G06F 12/0284; G06F 9/46; G06F 9/5016
USPC ......................................................... 711/104
See application file for complete search history.

(56) References Cited

U.S. PATENT DOCUMENTS

| | | | |
|---|---|---|---|
| 9,628,350 B2 | 4/2017 | Dippenaar et al. | |
| 9,794,366 B1 | 10/2017 | Pabon et al. | |
| 10,664,183 B1 * | 5/2020 | Weaver | G06F 3/0673 |
| 2006/0190482 A1 | 8/2006 | Kishan et al. | |
| 2007/0033367 A1 | 2/2007 | Sakarda et al. | |
| 2014/0208047 A1 * | 7/2014 | Vembu | G06F 12/0292 |
| | | | 711/161 |
| 2017/0277655 A1 * | 9/2017 | Das | G06F 15/17331 |
| 2021/0117320 A1 * | 4/2021 | Mahesh | G06F 3/067 |

OTHER PUBLICATIONS

Author Unknown, "The Challenge of Keeping Up with Data," Product Brief, intel.com/content/www/us/en/products/docs/memory-storage/optane-persistent-memory/optane-dc-persistent-memory-brief.html, accessed Sep. 23, 2019, Intel Corporation, 13 pages.

(Continued)

*Primary Examiner* — Gautam Sain
*Assistant Examiner* — Wei Ma
(74) *Attorney, Agent, or Firm* — Dority & Manning, P.A.

(57) ABSTRACT

Heterogeneous memory management and services. A memory metadata service obtains memory configuration information that identifies one or more sharable load-store memory segments available on each of a plurality of computing devices. The memory metadata service generates a memory metadata repository that comprises memory metadata that identifies, for each computing device of the plurality of computing devices, the one or more sharable load-store memory segments available on the computing device and, for each sharable load-store memory segment, a memory size of the sharable load-store memory segment and at least one memory attribute. The memory metadata service receives, from a first requesting computing device, a first memory allocation request that requests a first quantity of load-store memory. The memory metadata service sends, to the first requesting computing device, memory allocation information that identifies a first sharable load-store memory segment based on the memory metadata repository.

21 Claims, 10 Drawing Sheets

(56) References Cited

OTHER PUBLICATIONS

Bolotin, Evgeny, et al., "Designing Efficient Heterogeneous Memory Architectures," IEEE Micro, Jul. 2015, 9 pages.
Author Unknown, "Gen-Z Technology: Enabling Memory Centric Architecture," 2017, Gen-Z Consortium, 22 pages.

* cited by examiner

HETEROGENEOUS MEMORY MANAGEMENT AND SERVICES

BACKGROUND

Load-store computer memory technologies are advancing at a rapid pace, both in terms of size of memory and types of memories. If an existing computing device desires the advantages of a new memory technology, or additional memory, the computing device is typically taken offline and physically upgraded with the desired type and/or amount of memory.

SUMMARY

The examples disclosed herein implement heterogeneous memory management and services. In particular, the examples disclosed herein include an architecture that facilitates the generation and management of memory pools of different types of memories available over a high-speed memory access fabric.

In one example a method is provided. The method includes obtaining, by a memory metadata service executing on a computing device, memory configuration information that identifies one or more sharable load-store memory segments available on each of a plurality of computing devices. The method further includes generating a memory metadata repository that comprises memory metadata that identifies, for each computing device of the plurality of computing devices, the one or more sharable load-store memory segments available on the computing device and, for each sharable load-store memory segment, a memory size of the sharable load-store memory segment and at least one memory attribute. The method further includes receiving, from a first requesting computing device, a first memory allocation request that requests a first quantity of load-store memory. The method further includes sending, to the first requesting computing device, memory allocation information that identifies a first sharable load-store memory segment based on the memory metadata repository.

In another example a computing device is provided. The computing device includes a memory, and a processor device coupled to the memory. The processor device is to obtain, by a memory metadata service executing on the processor device, memory configuration information that identifies one or more sharable load-store memory segments available on each of a plurality of computing devices. The processor device is further to generate a memory metadata repository that comprises memory metadata that identifies, for each computing device of the plurality of computing devices, the one or more sharable load-store memory segments available on the computing device and, for each sharable load-store memory segment, a memory size of the sharable load-store memory segment and at least one memory attribute.

In another example a computer program product is provided. The computer program product is stored on a non-transitory computer-readable storage medium and includes instructions to cause a processor device to obtain, by a memory metadata service executing on the processor device, memory configuration information that identifies one or more sharable load-store memory segments available on each of a plurality of computing devices. The instructions further cause the processor device to generate a memory metadata repository that comprises memory metadata that identifies, for each computing device of the plurality of computing devices, the one or more sharable load-store memory segments available on the computing device and, for each sharable load-store memory segment, a memory size of the sharable load-store memory segment and at least one memory attribute. The instructions further cause the processor device to, in response to receipt of a memory allocation request from a first requesting computing device, send, to the first requesting computing device, memory allocation information that identifies a first sharable load-store memory segment based on the memory metadata repository.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
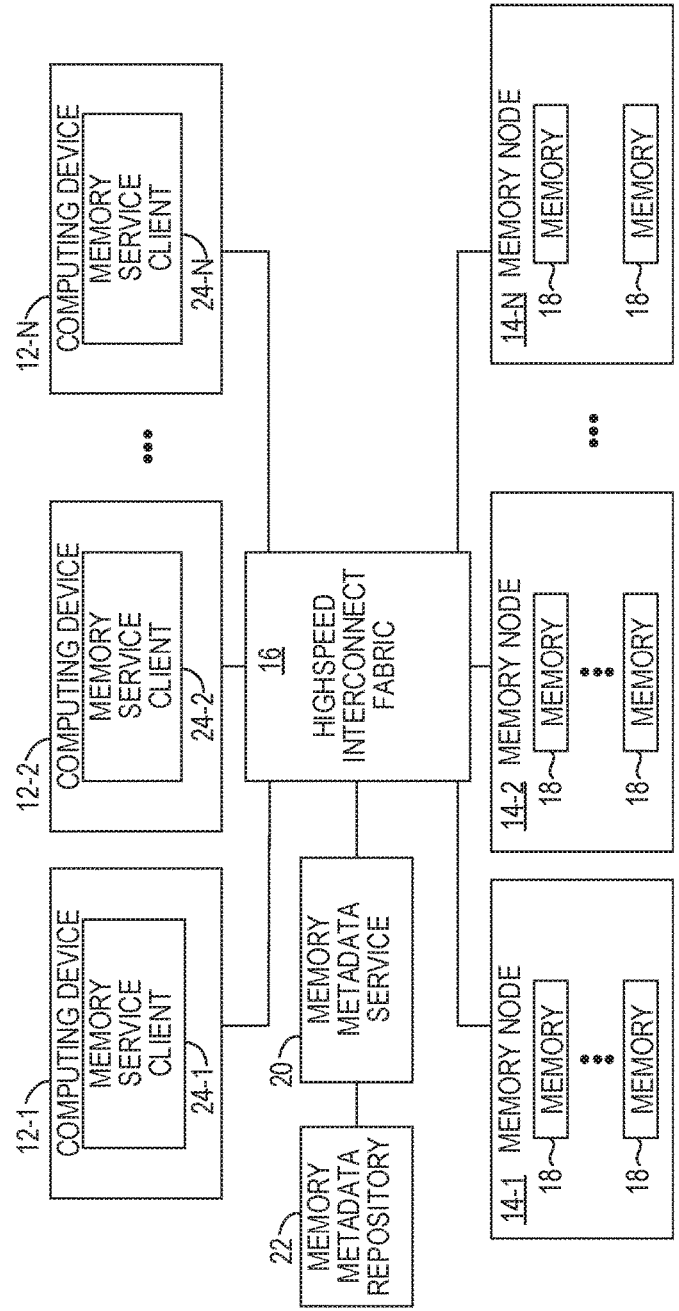
FIG. 1 is a block diagram of an environment in which heterogeneous memory management and services can be implemented according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Load-store computer memory technologies are advancing at a rapid pace, both in terms of size of memory and types of memories. If an existing computing device desires the advantages of a new memory technology, or requires additional quantities of memory, the computing device is typically taken offline and physically upgraded with the desired type and/or amount of memory.

The term "load-store" as used herein refers to computer memory and not data storage, such as hard drives, SSD drives, or the like. In contrast to data storage, load-store memory is memory that is accessed in response to load and store processor device operations, i.e., executable binary load/store instructions, as opposed to input/output (read/write) commands that utilize an I/O interface to access data storage.

Currently, computing devices are largely limited to the amount and types of memories that are physically installed in the computing device at the time of manufacture. If it is desired to provide a computing device with additional memory, or a different type of memory, the computing device is powered off, and an individual manually installs one or more memory circuit boards that interface with the computing device's processor device via a system bus. Upgrading a large number of computing devices can be costly and time-consuming. Moreover, often a computing device requires a maximum amount of memory only in relatively rare circumstances, and thus a large segment of the memory may go unused a majority of the time. Further, a computing device may be limited to a finite number of memory slots and/or types of memory and yet may, at times, have a need for a greater amount of memory than the computing device has, or is capable of having.

Newer memory technologies include persistent (i.e., non-volatile) memories that offer speeds similar to that of conventional DRAM (volatile) memory, but that can survive a power outage. Memory technologies, when first introduced into the market, often have higher costs, and thus upgrading a number of computing devices with such memory technologies can require a relatively large investment. Moreover, it may be that many applications would not benefit from such newer memory technologies while others may benefit. In a computing environment where applications may be initiated on computing devices on an arbitrary basis, such as in a cloud computing environment, it may be necessary to upgrade computing devices with expensive memory technologies simply because there is no way to determine whether an application that may be initiated on any particular computing device may require a new memory technology or not.

The examples disclosed herein implement heterogeneous memory management and services that resolve such issues. The examples disclosed herein include an architecture that facilitates the generation and management of memory pools of different types of memories available over a high-speed memory access fabric. A requesting computing device can be allocated a load-store memory segment of a requested amount of memory, which has designated memory attributes, such as persistence, data reduction, encryption, and/or speed, from another computing device that has such memory. The requesting computing device can then utilize the load-store memory segment over a high-speed memory access fabric and, when done utilizing the load-store memory segment, release the memory segment back into the respective memory pool.

In this manner, computing devices need not be continually upgraded with larger amounts or different types of memories, and can dynamically obtain access to both the amount of memory needed and type of memory needed on an as-needed basis.

FIG. 1 is a block diagram of an environment 10 in which heterogeneous memory management and services can be implemented according to one example. The environment 10 includes a plurality of computing devices 12-1-12-N that are communicatively coupled to each other and to a plurality of memory nodes 14-1-14-N via a high-speed interconnect fabric 16, such as, by way of non-limiting example, a remote direct memory access (RDMA) over Ethernet high-speed interconnect fabric. Note that the computing devices 12 are not limited to any particular instruction set.

The interconnect fabric 16 may utilize any suitable transport technology, such as, by way of non-limiting example, a load-store memory transport technology in accordance with the Gen-Z Consortium (https://genzconsortium.org/). Generally, the high-speed interconnect fabric 16 may have certain technical characteristics, such as sub-microsecond latency and a high bandwidth such as 25 Gbps. The high-speed interconnect fabric 16 may work in conjunction with multiple ports from each connected device to ensure multiple communication paths and high availability. The high-speed interconnect fabric 16 may utilize any suitable load-store memory transport protocol.

The memory nodes 14 are computing devices that have one or more memory boards 18. Each memory board 18 is a certain type of memory and has certain attributes, such as persistent or volatile, relatively fast access speeds or relatively slow access speeds, data reduction capabilities or not, encryption capabilities or not, and data duplication (i.e., high availability) capabilities or not. The environment 10 also includes a memory metadata service 20. The memory metadata service 20 maintains a memory metadata repository 22 that comprises memory metadata that identifies the memory boards 18 on the memory nodes 14, the amounts of the memory boards 18, the attributes of the memory boards 18, and other relevant information.

The computing devices 12 include corresponding memory service clients 24-1-24-N. The memory service clients 24 communicate with the memory metadata service 20 to obtain access to load-store memory segments on the memory nodes 14 for use with applications executing on the computing devices 12. For example, an application executing on the computing device 12-1 may need 256 gigabytes (GB) of persistent memory. The memory service client 24-1 interfaces with the memory metadata service 20 to obtain access to a persistent sharable load-store memory segment implemented on one of the memory nodes 14. The memory metadata service 20 identifies a suitable sharable load-store memory segment that is available on one or more of the memory nodes 14, and allocates the sharable load-store memory segment to the memory service client 24-1. The memory service client 24-1, in conjunction with a memory management unit (MMU) of the computing device 12-1, allocates the memory to the requesting application. Subsequent load and store operations by the application are implemented over the high-speed interconnect fabric 16 with the sharable load-store memory segment.

The memory metadata service 20 maintains track of which computing devices 12 are allocated sharable load-store memory segments, keeps track of which sharable load-store memory segments have been allocated, and what memory in the memory boards 18 remain available for allocation. When an application on a computing device 12 finishes utilizing a sharable load-store memory segment, the corresponding memory service client 24 notifies the memory metadata service 20, and the memory metadata service 20 marks the sharable load-store memory segment as being available for subsequent allocation. Note that while only a single memory metadata service 20 is illustrated, in other implementations the memory metadata service 20 may be distributed and/or mirrored across multiple different computing devices to ensure redundancy and high-availability.

Figure 2:
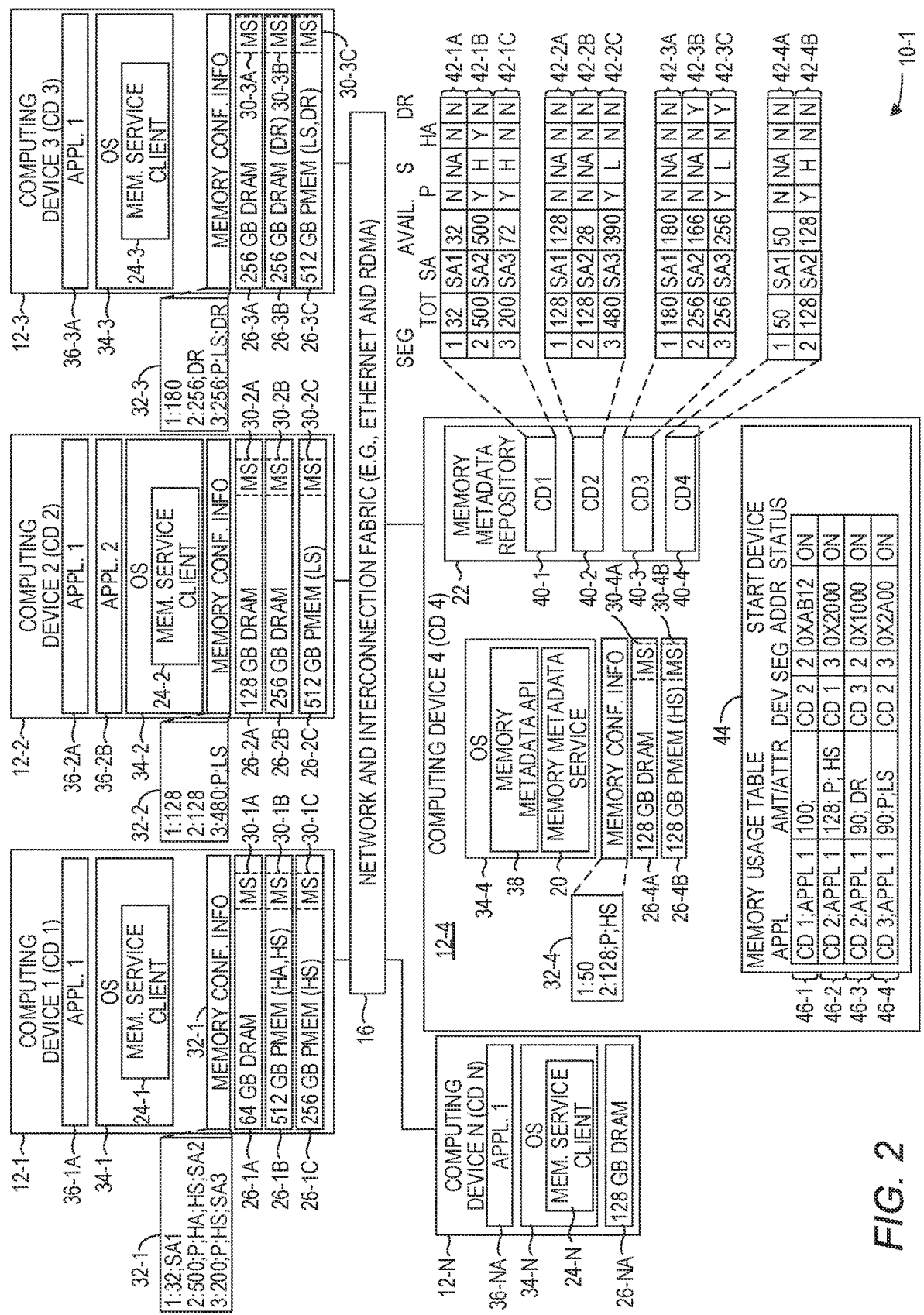
FIG. 2 is a block diagram of an environment in which heterogeneous memory management and services can be implemented in accordance with another implementation.

FIG. 2 is a block diagram of an environment 10-1 in accordance with another implementation. In the environment 10-1, the computing devices 12-1-12-N may serve as both memory nodes that have one or more sharable load-store memory segments, and as consumers of sharable load-store memory segments, as will be discussed in greater detail below. While solely for purposes of illustration the memory nodes 14 illustrated in FIG. 1 are not illustrated in FIG. 2, the memory nodes 14 may, in other implementations, operate in the environment 10-1 in conjunction with the computing devices 12.

The term "sharable load-store memory segment" as used herein refers to an amount of memory available on some device that can be shared. A sharable load-store memory segment is not limited to a particular physical memory module and can include a quantity of memory that encompasses multiple memory modules that have the same memory attributes, or can encompass less than all the memory on a memory module.

The computing device 12-1 contains three memory banks 26-1A-26-1C. Each of the memory banks 26-1A-26-1C may comprise any number of memory slots that accept memory modules. Each of the memory banks 26-1A-26-1C contains an amount of load-store memory that has the same attributes. The memory bank 26-1A has 64 GB of DRAM memory that is not designated as being a persistent (i.e., non-volatile) memory. The memory bank 26-1A includes a sharable load-store memory segment 30-1A that is 32 GB in size. Thus, the computing device 12-1 is reserving 32 GB of the memory bank 26-1A for its own use, and offering a 32 GB portion of the memory bank 26-1A for use by other computing devices 12.

The memory bank 26-1B has 512 GB of persistent memory. The persistent memory is high-speed persistent memory, and has a high-availability (i.e., redundancy) attribute. The memory bank 26-1B includes a sharable load-store memory segment 30-1B that is 500 GB in size. The term "persistent memory" refers to memory that retains its value after a power outage. Examples of persistent memory include, by way of non-limiting example, Intel® Optane™ memory and Nantero® memory. In some implementations some or all memories may have differences in speed characteristics among the same type of memory. For example, in this implementation, persistent memories may be designated as "slower speed" persistent memory or "higher speed" persistent memory. In this example, the memory bank 26-1B is a high speed persistent memory.

The memory bank 26-1C has 256 GB of persistent memory. The memory is persistent memory, and is designated as high speed. It is not designated as high availability, or being a data reduction (e.g., compression) memory. The memory bank 26-1C includes a sharable load-store memory segment 30-1C that is 200 GB in size.

The computing device 12-1 has memory configuration information 32-1 that identifies the three sharable load-store memory segments 30-1A-30-1C that are available on the computing device 12-1. The memory configuration information 32-1 indicates, by an entry "1:32;SA1", that the sharable load-store memory segment 30-1A is a 32 GB portion of the memory bank 26-1A, and further indicates that the sharable load-store memory segment 30-1A is not designated as being a persistent (i.e., non-volatile) memory, being a high availability (i.e., offering redundancy) memory, or being a data reduction (e.g., compression) memory. It should be noted that in some embodiments, sharable memory may be provided only in quantities that are a power of 2, such as 16 GB, 32 GB, 64 GB and the like. The "SA1" notation is a number, such as a binary or hexadecimal number, that identifies a starting address of the memory segment 30-1A within the memory bank 26-1A.

The memory configuration information 32-1 also indicates, by an entry "2:500;P;HA;HS; SA2" that the sharable load-store memory segment 30-1B is a 500 GB portion of the memory bank 26-1B, and further indicates that the sharable load-store memory segment 30-1B is persistent, high speed, and high availability, and is not data reduction memory. The "SA2" notation is a number, such as a binary or hexadecimal number, that identifies a starting address of the memory segment 30-1B within the memory bank 26-1B.

The memory configuration information 32-1 also indicates, by an entry "3:200;P;HS;SA3", that the sharable load-store memory segment 30-1C is a 200 GB portion of the memory bank 26-1C, and further indicates that the sharable load-store memory segment 30-1C is high speed and persistent, is not high availability, and is not a data reduction memory. The "SA3" notation is a number, such as a binary or hexadecimal number, that identifies a starting address of the memory segment 30-1C within the memory bank 26-1C.

As will be discussed in greater detail below, the memory configuration information 32-1 is provided to the memory metadata service 20 so that the memory metadata service 20 can allocate memory from the sharable load-store memory segments 30-1A-30-1C upon request. Note that the memory configuration information 32-1 is simply an example of the type of information that may be provided to the memory metadata service 20. For example, in some implementations, the memory configuration information 32-1 may include memory address ranges of the sharable load-store memory segments 30-1A-30-1C. The computing device 12-1 also includes the memory service client 24-1 that is part of an operating system 34-1. The computing device 12-1 is executing an application 36-1A that, as will be discussed in greater detail below, is utilizing a sharable load-store memory segment of the computing device 12-2.

The computing device 12-2 contains three memory banks 26-2A-26-2C. The memory bank 26-2A has 128 GB of DRAM memory that is not persistent or a data reduction memory. The memory bank 26-2A includes a sharable load-store memory segment 30-2A that is 128 GB in size. The memory bank 26-2B has 256 GB of DRAM memory that is not high availability, not persistent, and not a data reduction memory. The memory bank 26-2B includes a sharable load-store memory segment 30-2B that is 128 GB in size. The memory bank 26-2C has 512 GB of persistent memory that is low speed memory, but not high availability and not a data reduction memory. The memory bank 26-2C includes a sharable load-store memory segment 30-2C that is 480 GB in size. The computing device 12-2 includes memory configuration information 32-2, with three entries, that identifies the sharable load-store memory segments 30-2A—30-2C. Although not illustrated due to space constraints in FIG. 2, the memory configuration information 32-2 also includes, for each entry, information that identifies a starting address of the corresponding memory segments 30-2A-30-2C within the memory banks 26-2A-26-2C, respectively. The computing device 12-2 includes the memory service client 24-2 that is part of an operating system 34-2. The computing device 12-2 is executing applications 36-2A and 36-2B that, as will be discussed in greater detail below, are utilizing sharable load-store memory segments of the computing devices 12-1 and 12-3.

The computing device 12-3 contains three memory banks 26-3A-26-3C. The memory bank 26-3A has 256 GB of DRAM memory that is not high availability, not persistent, or a data reduction memory. The memory bank 26-3A includes a sharable load-store memory segment 30-3A that is 180 GB in size. The memory bank 26-3B has 256 GB of DRAM memory that is not high availability and not persistent, but that is a data reduction memory. The memory bank 26-3B includes a sharable load-store memory segment 30-3B that is 256 GB in size. The memory bank 26-3C has 512 GB of persistent memory that is low speed memory and not high availability, but that is a data reduction memory. The memory bank 26-3C includes a sharable load-store memory segment 30-3C that is 256 GB in size. The computing device 12-3 includes memory configuration information 32-3, with three entries, that identifies the sharable load-store memory segments 30-3A-30-3C. Although not illustrated due to space constraints in FIG. 2, the memory configuration information 32-3 also includes, for each entry, information that identifies a starting address of the corresponding memory segments 30-3A-30-3C within the memory banks 26-3A 26-3C, respectively.

The computing device 12-3 includes the memory service client 24-3 that is part of an operating system 34-3. The computing device 12-3 is executing an application 36-3A that, as will be discussed in greater detail below, is utilizing a sharable load-store memory segment of the computing device 12-2.

The computing device 12-4 contains two memory banks 26-4A-26-4B. The memory bank 26-4A has 128 GB of DRAM memory that is not high availability, not persistent or a data reduction memory. The memory bank 26-4A includes a sharable load-store memory segment 30-4A that is 50 GB in size. The memory bank 26-4B has 128 GB of PMEM memory, that is persistent, high speed, and is not high availability or a data reduction memory. The memory bank 26-4B includes a sharable load-store memory segment 30-4B that is 128 GB in size. The computing device 12-4 includes memory configuration information 32-4, with two entries, that identifies the sharable load-store memory segments 30-4A-30-4B. Although not illustrated due to space constraints in FIG. 2, the memory configuration information 32-4 also includes, for each entry, information that identifies a starting address of the corresponding memory segments 30-4A-30-4B within the memory banks 26-4A-26-4B, respectively.

The computing device 12-N contains an operation system 34-N, a memory service client 24-N, and an application 36-NA. The computing device 12-N includes one memory bank 26-NA, but contains no sharable memory.

Each of the applications 36 may be generated in conjunction with an application framework during a build process that implements some or all of the features disclosed herein with regard to the applications 36. Such an application framework can eliminate the need to modify each application 36 individually to implement any of the functionality described herein. As an example, the application framework may include functionality that communicates with the corresponding memory service client 24 to request a certain type of sharable load-store memory, such as persistent or non-persistent, high-speed or low-speed, or any other desired attributes. The application framework may also be able to accept runtime parameters that identify a desired type of sharable load-store memory.

In this implementation, rather than have a computing device 12 devoted to providing the memory metadata service 20, the computing device 12-4 also includes the memory metadata service 20. The memory metadata service 20 may communicate with the memory service clients 24-1-24-N via any suitable communications protocol. In one implementation, the memory metadata service 20 communicates with the memory service clients 24-1-24-N via a memory metadata application programming interface (API) 38. For purposes of brevity, the communications between the memory service clients 24-1-24-N and the memory metadata service 20 will be described below as direct communications; however, the communications may be made in any desired manner, such as, by way of non-limiting example, via the memory metadata API 38.

The memory metadata service 20 utilizes a number of structures, such as the memory metadata repository 22 and a memory usage table 44 to provide heterogeneous memory management and services. It will be appreciated that the use of the memory metadata repository 22 and the memory usage table 44 is merely one way the functionality described herein could be implemented, and the implementations are not limited to any particular data structure or data structures in implementing the functionality described herein. The memory metadata repository 22 and the memory usage table 44 may be maintained in a persistent memory, and/or storage device, that persists over a power outage.

The memory metadata service 20 receives the memory configuration information 32-1-32-4 from the memory service clients 24-1-24-4. In one implementation, for example, each memory service client 24, upon booting of the corresponding computing device 12, determines whether the corresponding configuration information 32 has previously been provided to the memory metadata service 20. If so, then the memory service client 24 does not send the memory configuration information 32 to the memory metadata service 20 because the memory metadata service 20 already has the memory configuration information 32. If the memory service client 24 determines that the memory configuration information 32 was not previously sent to the memory metadata service 20, or if the content of the memory configuration information 32 has changed, the memory service client 24 sends the memory configuration information 32 to the memory metadata service 20. In other implementations, the memory metadata service 20 may periodically, intermittently, and/or upon some event, request the memory configuration information 32 from the memory service clients 24. In other embodiments, the memory service client 24 may be stateless. Each time the memory service client 24 executes, the memory service client 24 sends the memory configuration information 32 to the memory metadata service 20, and the memory metadata service 20 compares the memory configuration information 32 to memory metadata repository 22 and updates the memory metadata repository 22 with any information contained in the memory configuration information 32 that differs from that in the memory metadata repository 22.

Upon receiving memory configuration information 32 for the first time, the memory metadata service 20 generates memory metadata in the form of an entry in the memory metadata repository 22 identifying the sharable load-store memory segment(s) 30 contained in the memory configuration information 32. For example, upon receiving the memory configuration information 32-1, the memory metadata service 20 generates an entry 40-1 that corresponds to the computing device 12-1 and that identifies the sharable load-store memory segments 30-1A-30-1C. In one implementation, the memory metadata service 20 generates a row of information for each sharable load-store memory segment 30-1A-30-1C, each row containing a plurality of data fields.

The memory metadata service 20 generates a row 42-1A that corresponds to the sharable load-store memory segment 30-1A. The row 42-1A contains a first data field (designated by the heading "SEG" in FIG. 2) that contains an identifier of the load-store memory segment 30-1A, in this example "1". A second field (designated by the heading "TOT" in FIG. 2) contains the total size, in GB, of the sharable load-store memory segment 30-1A, in this example 32 GB. A third field (designated by the heading "SA" in FIG. 2) contains the starting address of the respective memory segment 30. A fourth field (designated by the heading "AVAIL" in FIG. 2) contains the amount of memory that is currently available (i.e., not in use), in this example 32 GB. A fifth field (designated by the heading "P" in FIG. 2) indicates whether the sharable load-store memory segment 30-1A has the memory attribute of persistence, in this example, no. A sixth field (designated by the heading "S" in FIG. 2) indicates whether the sharable load-store memory segment 30-1A has the memory attribute of high speed or low speed. In this particular implementation, the memory attribute of low speed or high speed is limited to persistent memory, so is not applicable to the sharable load-store memory segment 30-1A. A seventh field (designated by the heading "HA" in FIG. 2) indicates whether the sharable load-store memory segment 30-1A has the memory attribute of high availability, in this example, no. An eighth field (designated by the heading "DR" in FIG. 2) indicates whether the sharable load-store memory segment 30-1A has the memory attribute of data reduction, in this example, no. It will be apparent that the fields of the row 42-1A are merely examples, and any appropriate and/or desired memory attributes may be maintained by the memory metadata service 20.

Similarly, the memory metadata service 20 generates a row 42-1B for the sharable load-store memory segment 30-1B and a row 42-1C for the sharable load-store memory segment 30-1C based on the memory configuration information 32-1. Note that the row 42-1C indicates, via the third field "AVAIL", that only 72 GB of the 200 total GB of memory are available.

The memory metadata service 20 generates an entry 40-2 that corresponds to the computing device 12-2, and that includes rows 42-2A-42-2C based on the memory configuration information 32-2. The memory metadata service 20 generates an entry 40-3 that corresponds to the computing device 12-3, and that includes rows 42-3A-42-3C based on the memory configuration information 32-3. The memory metadata service 20 generates an entry 40-4 that corresponds to the computing device 12-4, and that includes rows 42-4A-42-4B based on the memory configuration information 32-4.

As the memory metadata service 20 allocates memory from the sharable load-store memory segments 30 to requesting memory service clients 24, the memory metadata service 20 maintains entries in the memory usage table 44 that identifies the entities to which the memory has been allocated. The memory usage table 44 may be used to update the corresponding row 42 to reallocate memory to a sharable load-store memory segment 30 after an entity using the memory is done using the memory.

The memory usage table 44, at this point in time, comprises a plurality of entries 46-1-46-4. Each entry 46 contains a plurality of fields. The entry 46-1 contains a first field (designated by the heading "APPL" in FIG. 2) that indicates the entry 46-1 identifies sharable load-store memory that has been allocated to the application 36-1A of the computing device 12-1. A second field (designated by the heading "AMT/ATTR" in FIG. 2) indicates that 100 GB of sharable load-store memory has been allocated to the application 36-1A. A third field (designated by the heading "DEV" in FIG. 2) indicates that the allocated sharable load-store memory is on the computing device 12-2. A fourth field (designated by the heading "SEG" in FIG. 2) indicates that the allocated sharable load-store memory corresponds to the row 42-2B of the memory metadata repository 22. The row 42-2B in turn corresponds to the sharable load-store memory segment 30-2B. A fifth field (designated by the heading "START ADDR" in FIG. 2) identifies the starting memory address of the 100 GB of sharable load-store memory. A sixth field (designated by the heading "DEVICE STATUS" in FIG. 2) indicates that the computing device 12-2 is currently available.

The memory usage table 44 includes an entry 46-2 that identifies sharable load-store memory of the computing device 12-1 utilized by the application 36-2A of the computing device 12-2. An entry 46-3 identifies sharable load-store memory of the computing device 12-3 utilized by the application 36-2A of the computing device 12-2. An entry 46-4 identifies sharable load-store memory of the computing device 12-2 utilized by the application 36-3A of the computing device 12-3.

In some embodiments, the memory metadata service 20 may be characterized as a fulfillment and scheduling mechanism. The memory metadata service 20 collects and manages sharable load-store memory segments 30. The memory metadata service 20 schedules sharable memory requests from the memory service clients 24 and reclaims the sharable load-store memory segments 30 when the applications 36 are no longer using the sharable load-store memory segments 30.

Figure 3:
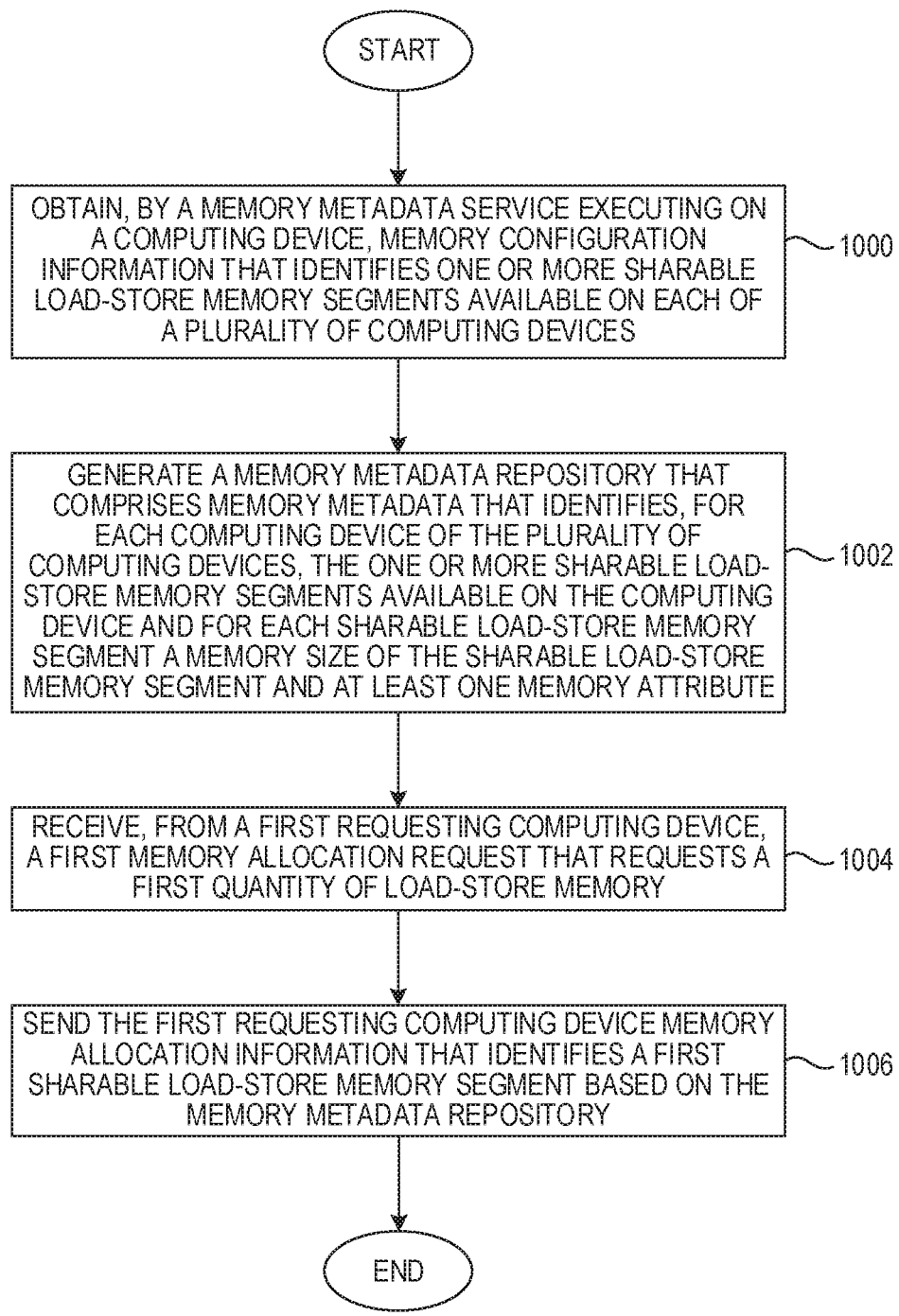
FIG. 3 is a flowchart of a method for heterogeneous memory management and services according to one implementation.

FIG. 3 is a flowchart of a method for heterogeneous memory management and services according to one implementation. FIG. 3 will be discussed in conjunction with FIG. 2. The memory metadata service 20 obtains the memory configuration information 32-1-32-4 that identifies the sharable load-store memory segments 30 available on each of the plurality of computing devices 12-1-12-4 (FIG. 3, block 1000). The memory metadata service 20 generates the memory metadata repository 22 that comprises memory metadata that identifies, for each computing device 12-1-12-4, the one or more sharable load-store memory segments 30 available on the computing device 12-1-12-4 and, for each sharable load-store memory segment 30, a memory size of the sharable load-store memory segment 30 and at least one memory attribute (FIG. 3, block 1002). The memory metadata service 20 receives, from a first requesting computing device 12, a first memory allocation request that requests a first quantity of load-store memory (FIG. 3, block 1004). The memory metadata service 20 sends, to the first requesting computing device 12, memory allocation information that identifies a first sharable load-store memory segment 30 based on the memory metadata repository 22 (FIG. 3, block 1006).

Figure 4A:
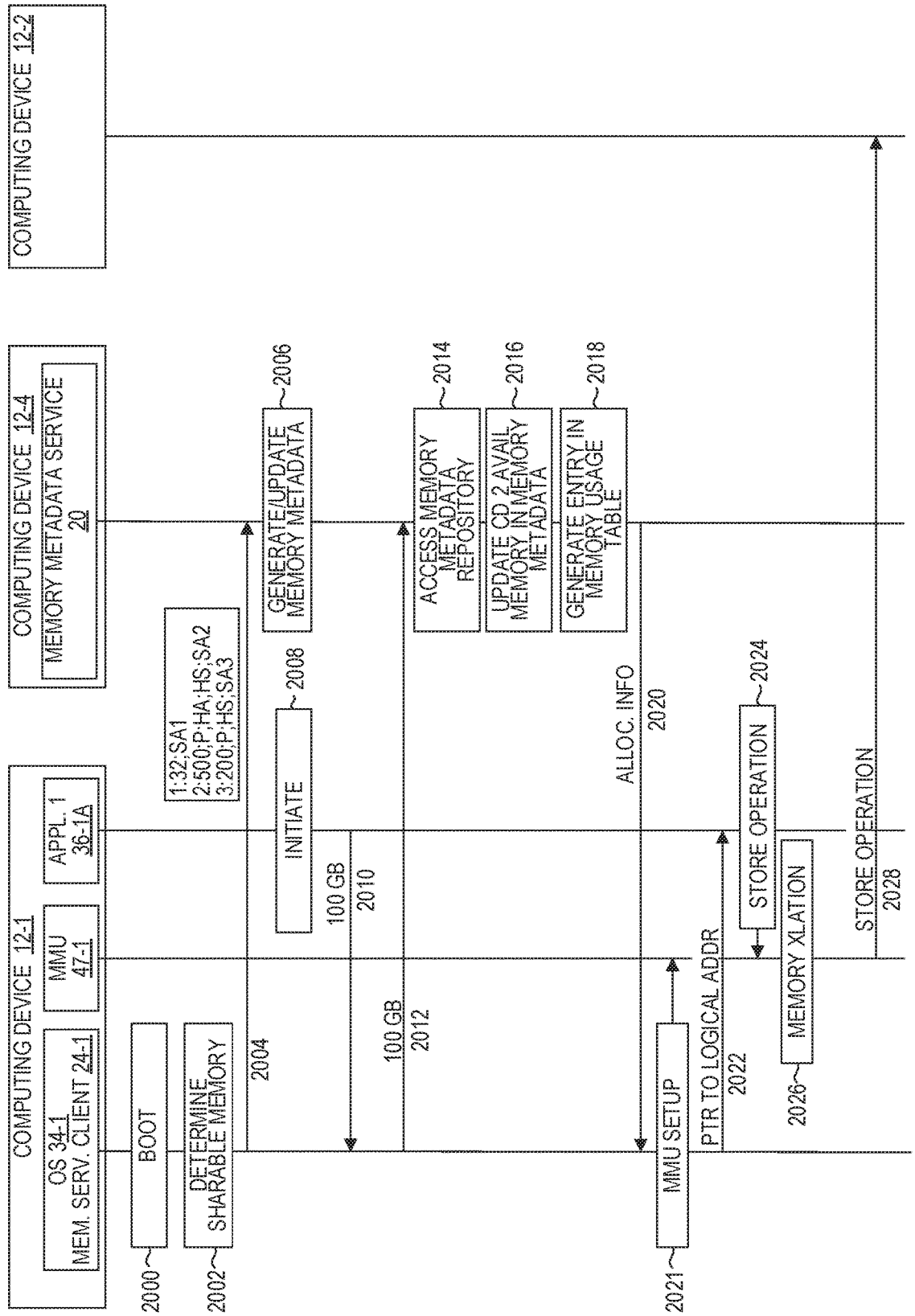
FIGS. 4A-4B are a message sequence diagram illustrating a sequence of messages and actions among the components illustrated in FIG. 2 implementing aspects of heterogeneous memory management and services according to one implementation.
Figure 4B:
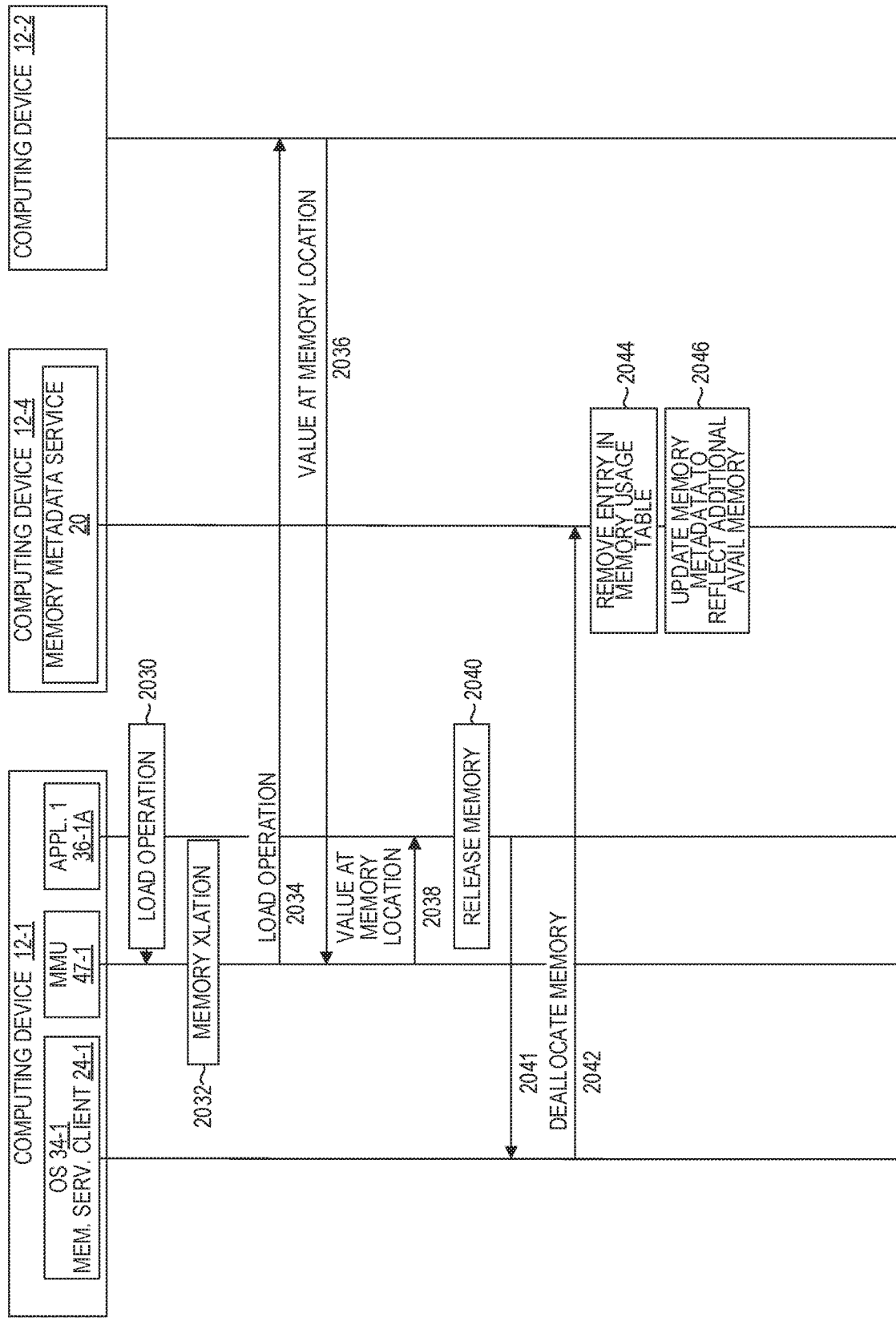

FIGS. 4A-4B are a message sequence diagram illustrating a sequence of messages and actions among the components illustrated in FIG. 2 implementing aspects of heterogeneous memory management and services according to one implementation. In this example, the computing device 12-1 begins the booting process (i.e., initialization) (FIG. 4A, step 2000). The memory service client 24-1 determines that the memory configuration information 32-1 has not previously been provided to the memory metadata services 20, and accesses the memory configuration information 32-1 to determine the sharable memory of the computing device 12-1 (FIG. 4A, step 2002). The memory service client 24-1 sends the memory configuration information 32-1 to the memory metadata service 20 (FIG. 4A, step 2004). As discussed above, in other embodiments, the memory service client 24-1 may send the memory configuration information 32-1 to the memory metadata service 20 each time the memory service client 24-1 initiates.

The memory metadata service 20 generates memory metadata in the form of the entry 40-1 in the memory metadata repository 22 that identifies the sharable load-store memory segments 30-1A-30-1C (FIG. 4A, step 2006). The application 36-1A initiates on the computing device 12-1 (FIG. 4A, step 2008). The application 36-1A requests 100 GB of memory, and does not indicate that the memory has any particular memory attributes. In this implementation, such a request may default to a request for non-persistent memory that does not have high-availability or data reduction capabilities (FIG. 4A, step 2010).

The memory service client 24-1 sends a request to the memory metadata service 20 for 100 GB of memory (FIG. 4A, step 2012). The memory metadata service 20 accesses the memory metadata repository 22 to determine whether 100 GB of memory can be allocated (FIG. 4A, step 2014). For purposes of illustration, assume that the computing devices 12-2-12-4 have previously provided corresponding memory configuration information 32-2-32-4 to the memory metadata service 20, and thus that entries 40-1-40-4 exist in the memory metadata repository 22. Based on row 42-2B of the entry 40-2, the memory metadata service 20 determines that the computing device 12-2 has 128 GB of sharable memory available. The memory metadata service 20 modifies the row 42-2B to deduct 100 GB of memory from the available memory field, resulting in 28 GB of available memory remaining (FIG. 4A, step 2016). The memory metadata service 20 generates the entry 46-1 in the memory usage table 44 indicating that 100 GB of sharable load-store memory from the sharable load-store memory segment 30-2B has been allocated to the application 36-1A of the computing device 12-1 (FIG. 4A, step 2018). It is noted that, in some embodiments, the memory metadata service 20 may first attempt to satisfy a request for sharable memory from a sharable load-store memory segment 30 of the computing device 12 from which the request originated in order to reduce latency.

Note that, in some embodiments, if sufficient capacity of the requested memory type is not available, the memory metadata service 20 may identify a suitable alternative. For example, if the memory metadata service 20 receives a request for 256 GB of low-speed persistent memory, and there is no sharable load-store memory segment 30 of that type and capacity available, but there is 256 GB of high-speed persistent memory available, the memory metadata service 20 may instead fulfill the request with the 256 GB of high-speed persistent memory.

The memory metadata service 20 sends memory allocation information to the memory service client 24-1 that identifies the sharable load-store memory segment 30-2B (FIG. 4A, step 2020). The content of the memory allocation information may differ depending on the particular implementation; however, in one implementation, the memory allocation information includes a physical memory address identifying the beginning of the 100 GB memory range allocated to the application 36-1A, and sufficient addressing information of the computing device 12-2 to facilitate communications between the application 36-1A and the computing device 12-2. Note that the 100 GB of memory allocated to the application 36-1A is less than the total amount of the size of the sharable load-store memory segment 30-2B, and thus that 28 GB of the sharable load-store memory segment 30-2B remains available to be allocated to another requester.

The memory service client 24-1 receives the memory allocation information and sets up a hardware memory management unit (MMU) 47-1 of the computing device 12-1 based on the memory allocation information (FIG. 4A, step 2021). The MMU 47-1 and corresponding support fabric access protocols manage the logical to physical address translations that support local and remote memory load and store operations by the application 36-1A. The memory service client 24-1 returns to the application 36-1A information indicating that the requested 100 GB of memory has been allocated, including, in this implementation, a pointer to a logical memory address of the beginning of the 100 GB of memory (FIG. 4A, step 2022). The application 36-1A performs a store operation on a memory location (FIG. 4A, step 2024). The MMU 47-1 translates the identified memory location/range from a logical memory address to a physical memory address in the sharable load-store memory segment 30-2B (FIG. 4A, step 2026). The MMU 47-1 then facilitates a store operation on the appropriate memory address in the sharable load-store memory segment 30-2B via the high-speed interconnect fabric 16 (FIG. 4A, step 2028).

Referring now to FIG. 4B, the application 36-1A performs a load operation on a memory location (FIG. 4B, step 2030). The MMU 47-1 translates the identified memory location/range from a logical memory address to a physical memory address in the sharable load-store memory segment 30-2B (FIG. 4B, step 2032). The MMU 47-1 then facilitates a load operation on the appropriate memory address in the sharable load-store memory segment 30-2B via the high-speed interconnect fabric 16 (FIG. 4B, step 2034). In response to the load operation, the computing device 12-2 returns the value stored in the identified memory location (FIG. 4B, step 2036). The MMU 47-1 directs the value to the application 36-1A as the result of the load operation (FIG. 4B, step 2038).

At some subsequent point in time, the application 36-1A terminates or otherwise releases the memory (FIG. 4B, steps 2040-2041). The memory service client 24-1 sends a deallocation message to the memory metadata service 20 indicating that the 100 GB of memory previously allocated to the application 36-1A can be returned to the memory pool (FIG. 4B, step 2042). The memory metadata service 20 removes the entry 46-1 from the memory usage table 44 (FIG. 4B, step 2044). The memory metadata service 20 updates the row 42-2B of the memory metadata repository 22 to increase the amount of available memory by 100 GB (FIG. 4B, step 2046). In some embodiments the memory metadata service 20 may automatically shred, or otherwise obscure, the deallocated memory upon deallocation. This may be particularly useful, for example, where the memory being deallocated is persistent memory. In some embodiments, the deallocation message may contain a parameter that indicates whether or not the deallocated memory should be shredded.

Note that if the memory metadata service 20 determines, based on the memory metadata repository 22, that no single sharable load-store memory segment 30 can satisfy a request for sharable load-store memory, then the memory metadata service 20 can respond with allocation information that identifies multiple sharable load-store memory segments 30. For example, assume in the example above that the memory service client 24-1 sends a request to the memory metadata service 20 for 200 GB of memory rather than 100 GB of memory. The memory metadata service 20 accesses the memory metadata repository 22 to determine whether 200 GB of memory can be allocated. The memory metadata service 20 determines that no single sharable load-store memory segment 30 has 200 GB of memory available. The memory metadata service 20 may then, based on the row 42-2B, allocate all of the 128 GB available on the sharable load-store memory segment 30-2B, and, based on the row 42-3A, allocate 72 GB of memory from the sharable load-store memory segment 30-3A. The memory metadata service 20 then sends memory allocation information to the memory service client 24-1 that, for example, utilizing scatter-gather methods, identifies the sharable load-store memory segment 30-2B and the sharable load-store memory segment 30-3A, as well as the amounts of memory being allocated from each of such sharable load-store memory segments 30.

Figure 5:
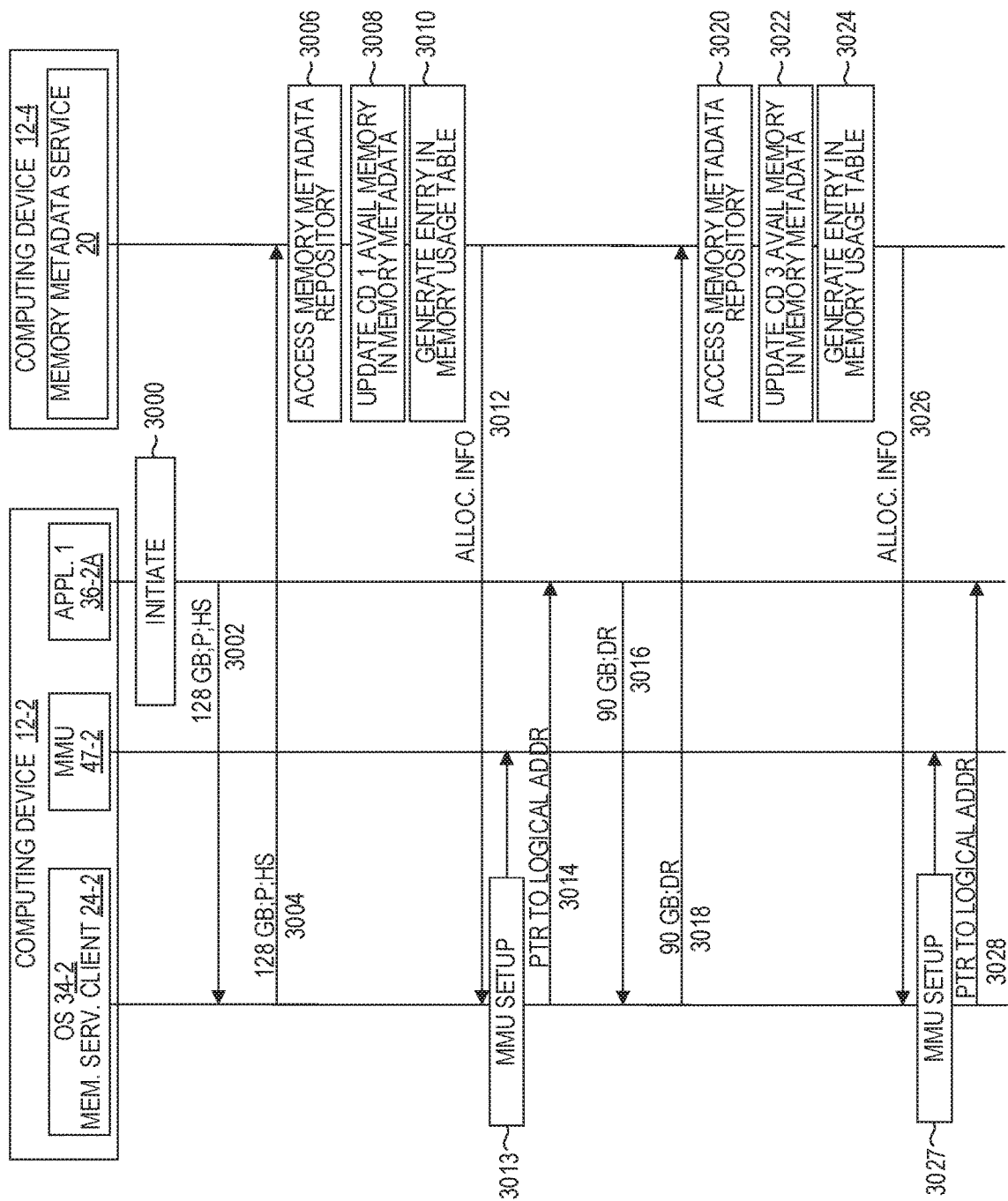
FIG. 5 is message sequence diagram illustrating a sequence of messages and actions among the components illustrated in FIG. 2 implementing aspects of heterogeneous memory management and services according to another implementation.

FIG. 5 is message sequence diagram illustrating a sequence of messages and actions among the components illustrated in FIG. 2 implementing aspects of heterogeneous memory management and services according to another implementation. For purposes of illustration, again assume that the computing devices 12-1-12-4 have previously provided corresponding memory configuration information 32-1-32-4 to the memory metadata service 20, and thus that entries 40-1-40-4 exist in the memory metadata repository 22. In this example, the application 36-2A initiates on the computing device 12-2 (FIG. 5, step 3000). The application 36-2A requests 128 GB of persistent high-speed memory (FIG. 5, step 3002). The memory service client 24-2 sends a request to the memory metadata service 20 for 128 GB of persistent high-speed memory (FIG. 5, step 3004). The memory metadata service 20 accesses the memory metadata repository 22 to determine whether 128 GB of persistent high-speed memory can be allocated (FIG. 5, step 3006). Based on row 42-1C of the entry 40-1, the memory metadata service 20 determines that the computing device 12-1 has 128 GB of persistent high-speed sharable memory available. The memory metadata service 20 modifies the row 42-1C to deduct 128 GB of memory from the available memory field, resulting in 72 GB of available memory remaining (FIG. 5, step 3008). The memory metadata service 20 generates the entry 46-2 in the memory usage table 44 indicating that 128 GB of sharable load-store memory from the sharable load-store memory segment 30-1C has been allocated to the application 36-2A of the computing device 12-2 (FIG. 5, step 3010).

The memory metadata service 20 sends memory allocation information to the memory service client 24-2 that identifies the sharable load-store memory segment 30-1C (FIG. 5, step 3012). The memory service client 24-2 receives the memory allocation information and sets up an MMU 47-2 of the computing device 12-2 based on the memory allocation information (FIG. 5, step 3013). The memory service client 24-2 returns to the application 36-2A information indicating that the requested 128 GB of memory has been allocated, including, in this implementation, a pointer to a logical memory address of the beginning of the 128 GB of memory (FIG. 5, step 3014).

The application 36-2A now requests 90 GB of data reduction memory (FIG. 5, step 3016). The memory service client 24-2 sends a request to the memory metadata service 20 for 90 GB of data reduction memory (FIG. 5, step 3018). The memory metadata service 20 accesses the memory metadata repository 22 to determine whether 90 GB of data reduction memory can be allocated (FIG. 5, step 3020). Based on row 42-3B of the entry 40-3, the memory metadata service 20 determines that the computing device 12-3 has 90 GB of data reduction memory available. The memory metadata service 20 modifies the row 42-3B to deduct 90 GB of memory from the available memory field, resulting in 166 GB of available memory remaining (FIG. 5, step 3022). The memory metadata service 20 generates the entry 46-3 in the memory usage table 44 indicating that 90 GB of data reduction memory from the sharable load-store memory segment 30-3B has been allocated to the application 36-2A of the computing device 12-2 (FIG. 5, step 3024).

The memory metadata service 20 sends memory allocation information to the memory service client 24-2 that identifies the sharable load-store memory segment 30-3B (FIG. 5, step 3026). The memory service client 24-2 receives the memory allocation information and sets up the MMU 47-2 of the computing device 12-2 based on the memory allocation information (FIG. 5, step 3027). The memory service client 24-2 returns to the application 36-2A information indicating that the requested 90 GB of memory has been allocated, including, in this implementation, a pointer to a logical memory address of the beginning of the 90 GB of memory (FIG. 5, step 3028).

Figure 6:
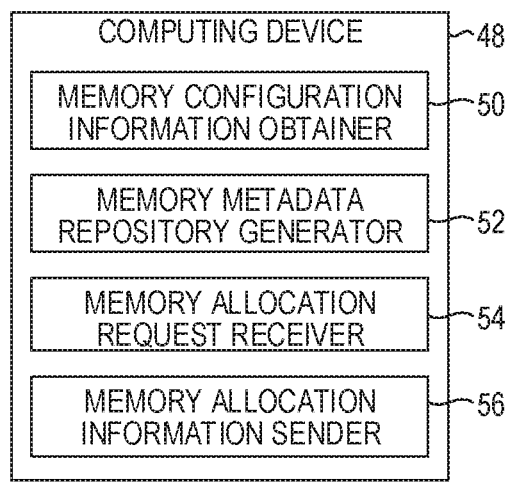
FIG. 6 is a block diagram of a computing device suitable for implementing aspects illustrated in FIGS. 1-5 according to one implementation.

FIG. 6 is a block diagram of a computing device 48 suitable for implementing the memory metadata service 20 illustrated in FIGS. 1-5 according to one implementation. The computing device 48 includes a memory configuration information obtainer 50 to obtain the memory configuration information 32-1-32-4 that identifies the one or more sharable load-store memory segments 30 available on each of the plurality of computing devices 12-1-12-4. The memory configuration information obtainer 50 may comprise executable software instructions configured to program a processor device to implement the functionality of obtaining the memory configuration information 32-1-32-4, may comprise circuitry including, by way of non-limiting example, an application-specific integrated circuit (ASIC), field-programmable gate array (FPGA), or may comprise a combination of executable software instructions and circuitry.

The computing device 48 includes a memory metadata repository generator 52 to generate the memory metadata in the memory metadata repository 22 that identifies, for each of the computing devices 12-1-12-4, the one or more sharable load-store memory segments 30 available on the computing devices 12-1-12-4, and for each sharable load-store memory segment 30, a memory size of the sharable load-store memory segment 30. The memory metadata repository generator 52 may comprise executable software instructions configured to program a processor device to implement the functionality of generating the memory metadata in the memory metadata repository 22, may comprise circuitry including, by way of non-limiting example, an application-specific integrated circuit (ASIC), field-programmable gate array (FPGA), or may comprise a combination of executable software instructions and circuitry.

The computing device 48 includes a memory allocation request receiver 54 to receive, from a requesting computing device 12, a memory allocation request that requests a quantity of load-store memory. The memory allocation request receiver 54 may comprise executable software instructions configured to program a processor device to implement the functionality of receiving a memory allocation request, may comprise circuitry including, by way of non-limiting example, an application-specific integrated circuit (ASIC), field-programmable gate array (FPGA), or may comprise a combination of executable software instructions and circuitry.

The computing device 48 includes a memory allocation information sender 56 to send the requesting computing device memory allocation information that identifies a sharable load-store memory segment 30 based on the memory metadata repository 22. The memory allocation information sender 56 may comprise executable software instructions configured to program a processor device to implement the functionality of sending the memory allocation information that identifies a sharable load-store memory segment 30 based on the memory metadata repository 22 to the requesting computing device 12, may comprise circuitry including, by way of non-limiting example, an application-specific integrated circuit (ASIC), field-programmable gate array (FPGA), or may comprise a combination of executable software instructions and circuitry.

Figure 7:
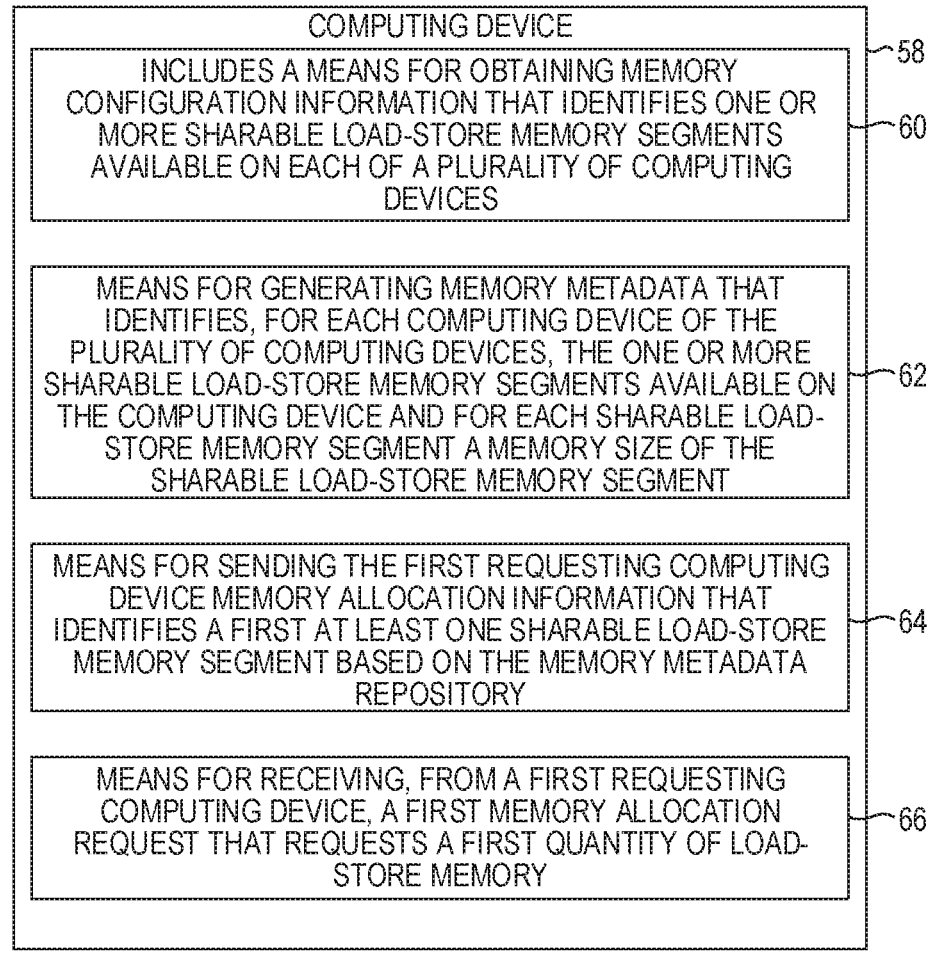
FIG. 7 is a block diagram of a computing device suitable for implementing aspects illustrated in FIGS. 1-5 according to additional implementations.

FIG. 7 is a block diagram of a computing device 58 suitable for implementing aspects illustrated in FIGS. 1-5 according to additional implementations. In this implementation, the computing device 58 includes a means 60 for obtaining the memory configuration information 32-1-32-4 that identifies the sharable load-store memory segments 30 available on each of the computing devices 12-1-12-4. The means 60 may be implemented in any number of manners, including, for example, via the memory configuration information obtainer 50 illustrated in FIG. 6, and/or as described above with regard to FIGS. 1-5.

The computing device 58 also includes a means 62 for generating the memory metadata in the memory metadata repository 22 that identifies, for each of the computing devices 12-1-12-4, the sharable load-store memory segments 30 available on the computing devices 12-1-12-4 and, for each sharable load-store memory segment 30, a memory size of the sharable load-store memory segment 30. The means 62 may be implemented in any number of manners, including, for example, via the memory metadata repository generator 52 illustrated in FIG. 6, and/or as described above with regard to FIGS. 1-5.

The computing device 58 also includes a means 64 for sending the requesting computing device 12 the memory allocation information that identifies the sharable load-store memory segment 30 based on the memory metadata repository 22. The means 64 may be implemented in any number of manners, including, for example, via the memory allocation information sender 56 illustrated in FIG. 6, and/or as described above with regard to FIGS. 1-5.

The computing device 58 also includes a means 66 for receiving, from a requesting computing device 12, a memory allocation request that requests a quantity of load-store memory. The means 66 may be implemented in any number of manners, including, for example, via the memory allocation request receiver 54 illustrated in FIG. 6, and/or as described above with regard to FIGS. 1-5.

Figure 8:
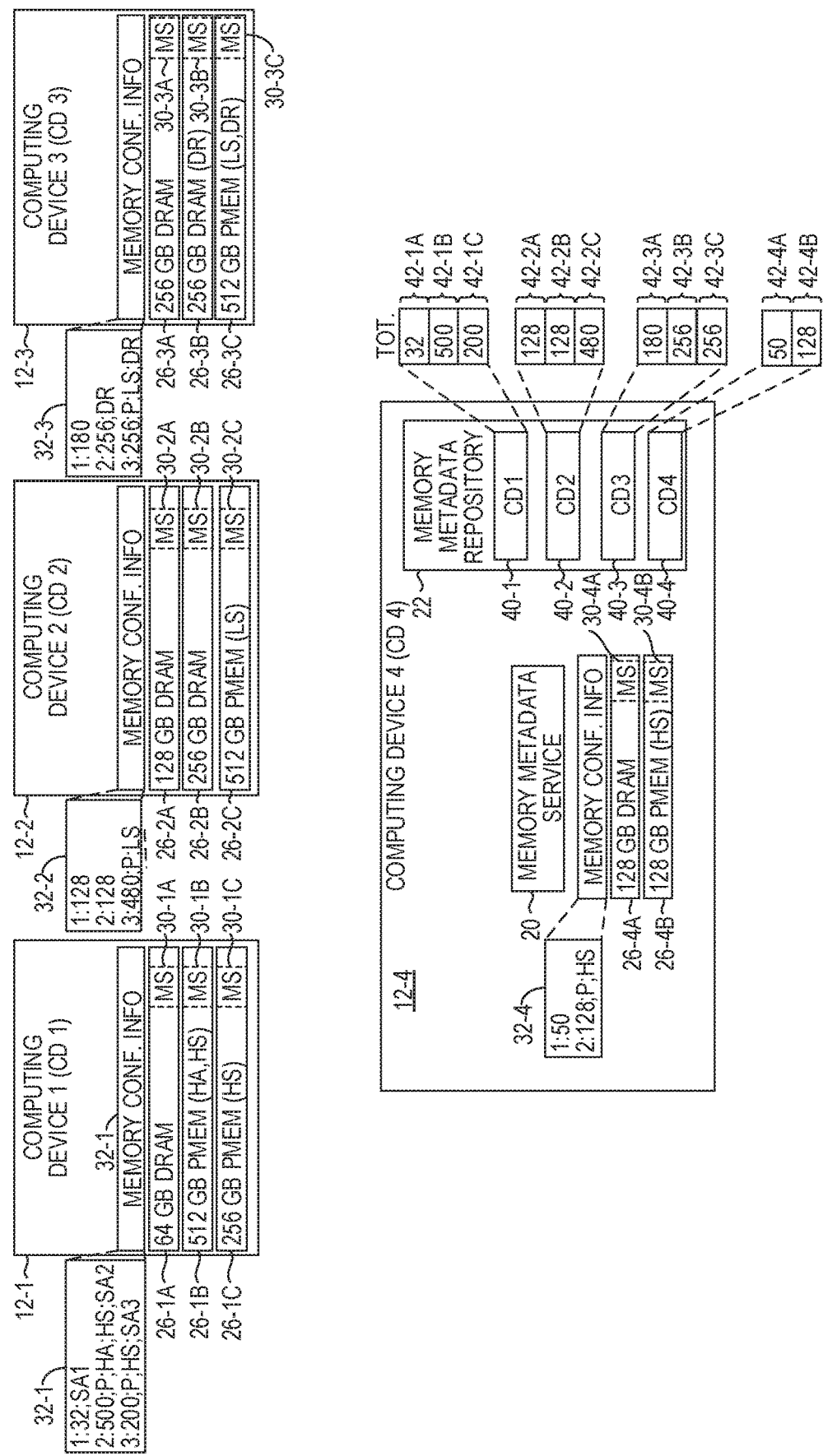
FIG. 8 is a simplified block diagram of the environment illustrated in FIG. 2 according to another implementation.

FIG. 8 is a simplified block diagram of the environment 10-1 illustrated in FIG. 2 according to another implementation. In this implementation the memory metadata service 20, executing on the computing device 12-4, receives memory configuration information that identifies one or more sharable load-store memory segments 30 available on each of the computing devices 12-1-12-4. The memory metadata service 20 generates a memory metadata repository 22 that comprises memory metadata that identifies, for each computing device 12-1-12-4, the one or more sharable load-store memory segments 30 available on the computing devices 12-1-12-4 and, for each sharable load-store memory segment 30, a memory size of the sharable load-store memory segment 30. The memory metadata service 20 receives, from a requesting computing device 12-1, a first memory allocation request that requests a quantity of load-store memory. The memory metadata service 20 sends the requesting computing device 12-1 memory allocation information that identifies the load-store memory segment 30 based on the memory metadata repository 22.

Figure 9:
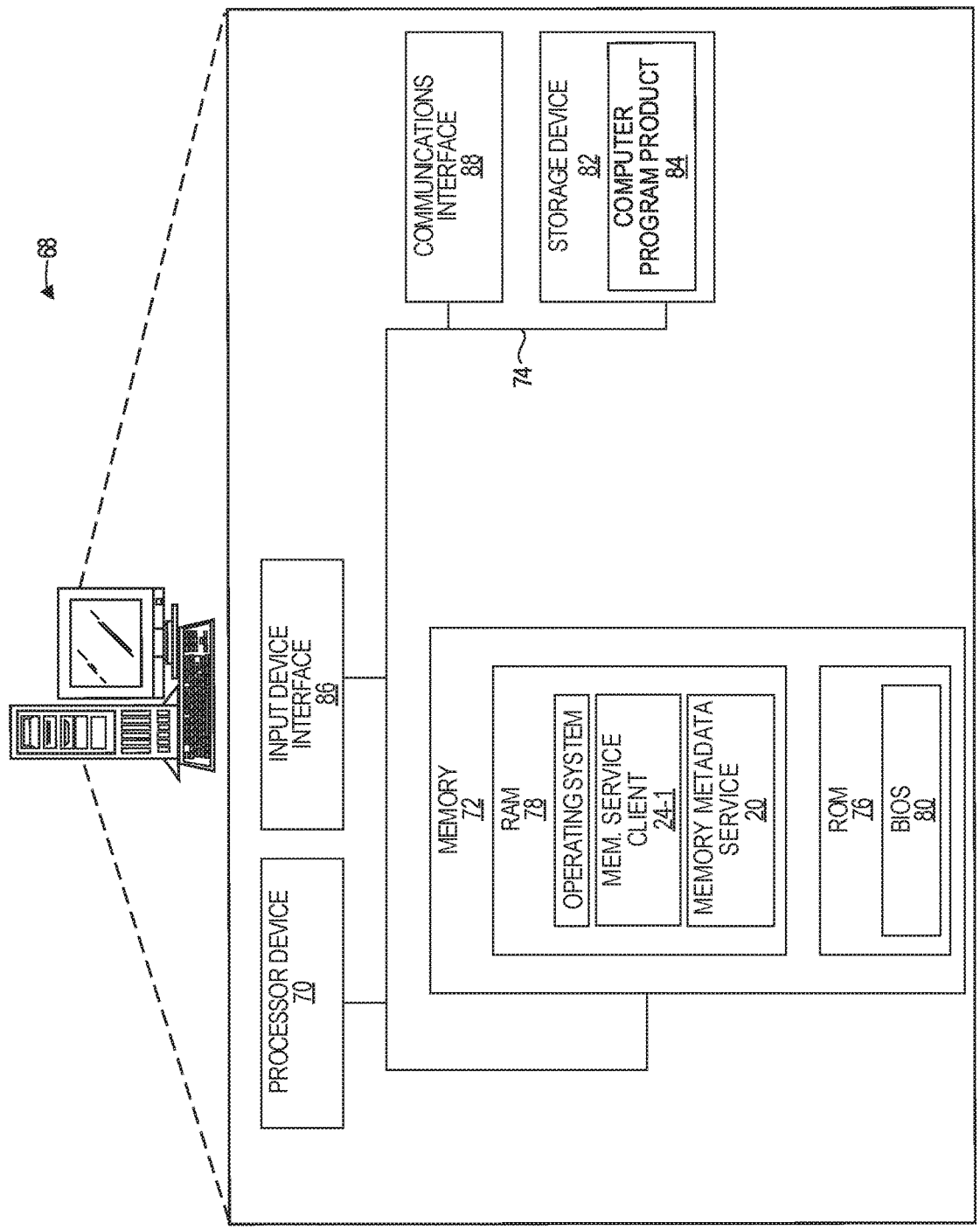
FIG. 9 is a block diagram of a computing device suitable for implementing any of the computing devices illustrated in FIG. 2.

FIG. 9 is a block diagram of a computing device 68 suitable for implementing any of the computing devices 12-1-12-N. The computing device 68 may comprise any computing or electronic device capable of including firmware, hardware, and/or executing software instructions to implement the functionality described herein, such as a computer server, a desktop computing device, a laptop computing device, or the like. The computing device 68 includes a processor device 70 and one or more load-store memories 72. A system bus 74 provides an interface for system components including, but not limited to, the memory 72 and the processor device 70. The processor device 70 can be any commercially available or proprietary processor.

The system bus 74 may be any of several types of bus structures that may further interconnect to a memory bus (with or without a memory controller), a peripheral bus, and/or a local bus using any of a variety of commercially available bus architectures. The memory 72 may include non-volatile memory 76 e.g., read-only memory (ROM), erasable programmable read-only memory (EPROM), electrically erasable programmable read-only memory (EEPROM), etc.), and volatile memory 78 (e.g., random-access memory (RAM)). A basic input/output system (BIOS) 80 may be stored in the non-volatile memory 76 and can include the basic routines that help to transfer information between elements within the computing device 68. The volatile memory 78 may also include a high-speed RAM, such as static RAM, for caching data.

The computing device 68 may further include or be coupled to a non-transitory computer-readable storage medium such as a storage device 82, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 82 and other drives associated with computer-readable media and computer-usable media may provide non-volatile storage of data, data structures, computer-executable instructions, and the like.

A number of modules can be stored in the storage device 82 and in the volatile memory 78, including an operating system and one or more program modules, such as the memory metadata service 20 or the memory service client 24-1, which may implement the functionality described herein in whole or in part.

All or a portion of the examples may be implemented as a computer program product 84 stored on a transitory or non-transitory computer-usable or computer-readable storage medium, such as the storage device 82, which includes complex programming instructions, such as complex computer-readable program code, to cause the processor device 70 to carry out the steps described herein. Thus, the computer-readable program code can comprise software instructions for implementing the functionality of the examples described herein when executed on the processor device 70. The processor device 70, in conjunction with the memory metadata service 20 in the volatile memory 78, may serve as a controller, or control system, for the computing device 68 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 70 through an input device interface 86 that is coupled to the system bus 74 but can be connected by other interfaces such as a parallel port, an Institute of Electrical and Electronic Engineers (IEEE) 1394 serial port, a Universal Serial Bus (USB) port, an IR interface, and the like. The computing device 68 may also include a communications interface 88, such as an Ethernet transceiver, suitable for communicating with the high-speed interconnect fabric 16.

Other computer system designs and configurations may also be suitable to implement the systems and methods described herein. The following examples illustrate various implementations in accordance with one or more aspects of the disclosure.

Example 1 is a computing device that includes a memory configuration information obtainer to obtain memory configuration information that identifies one or more sharable load-store memory segments available on each of a plurality of computing devices; a memory metadata repository generator to generate memory metadata that identifies, for each computing device of the plurality of computing devices, the one or more sharable load-store memory segments available on the computing device and, for each sharable load-store memory segment, a memory size of the sharable load-store memory segment; a memory allocation request receiver to receive, from a first requesting computing device, a first memory allocation request that requests a first quantity of load-store memory; and a memory allocation information sender to send, to the first requesting computing device, memory allocation information that identifies a first at least one sharable load-store memory segment based on the memory metadata repository.

Example 2 is the computing device of example 1 wherein the first memory allocation request identifies a requested amount of memory and a requested memory attribute, and wherein to provide, to the first requesting computing device, memory allocation information that identifies the sharable load-store memory segment based on the memory metadata repository, the computing device further comprises a determiner for determining, based on the memory metadata repository, that the first at least one sharable load-store memory segment has an amount of available memory greater than or equal to the requested amount of memory, and that the first at least one sharable load-store memory segment has the requested memory attribute.

Example 3 is a computing device that includes a means for obtaining memory configuration information that identifies one or more sharable load-store memory segments available on each of a plurality of computing devices; a means for generating memory metadata that identifies, for each computing device of the plurality of computing devices, the one or more sharable load-store memory segments available on the computing device and, for each sharable load-store memory segment, a memory size of the sharable load-store memory segment; a means for receiving, from a first requesting computing device, a first memory allocation request that requests a first quantity of load-store memory; and a means for sending, to the first requesting computing device, memory allocation information that identifies a first at least one sharable load-store memory segment based on the memory metadata repository.

Example 4 is the computing device of example 3, wherein the first memory allocation request identifies a requested amount of memory and a requested memory attribute, and wherein to provide, to the first requesting computing device, memory allocation information that identifies the sharable load-store memory segment based on the memory metadata repository, the computing device further comprises a means for determining, based on the memory metadata repository, that the first at least one sharable load-store memory segment has an amount of available memory greater than or equal to the requested amount of memory, and that the first at least one sharable load-store memory segment has the requested memory attribute.

Example 5 is a method comprising accessing, by a memory services client executing on a computing device, information that identifies sharable memory of the computing device, and sending the information to a memory metadata service on a different computing device.

Example 6 is the method of example 5 further comprising receiving, by the memory services client, a first request for an allocation of memory from a first application executing on the computing device; determining, by the memory services client based on the first request, an amount of memory and a memory attribute associated with the first request; sending the request for the memory to the memory metadata service; receiving a response from the memory metadata service that identifies an allocation of memory on a different computing device; and sending a response to the first application.

Example 7 is the method of example 6 further comprising facilitating, via an MMU and a high-speed memory fabric, a memory load operation of the first application; sending a memory load request to the different computing device; receiving, from the different computing device, data stored at a location in memory of the different computing device referenced by the memory load request; and returning the data to the first application.

Example 8 is the method of example 6 further comprising facilitating, via an MMU and a high-speed memory fabric, a memory store operation of the first application that includes data; and sending the data to the different computing device for storage in a memory at a designated location.

Example 9 is the method of example 6 further comprising receiving a second request for an allocation of memory from a second application executing on the computing device; determining, by the memory services client based on the second request, an amount of memory and a memory attribute associated with the second request; sending a request for the memory to the memory metadata service; receiving a response from the memory metadata service that identifies an allocation of memory on a different computing device; and sending a response to the second application.

Example 10 is the method of example 9 wherein the allocation of memory for the first application is on a first computing device and the allocation of memory for the second application is on a second computing device.

Example 11 is the method of example 5 further comprising determining that the first application has terminated; and sending a message to the memory metadata services to deallocate the memory allocated to the first application.

Example 12 is a computing device comprising a memory and a processor device coupled to the memory, wherein the processor device is to execute a memory services client that receives information that identifies sharable memory of the computing device; and sends the information to a memory metadata service on a different computing device.

Example 13 is the computing device of example 12 wherein the memory service client is further to receive a first request for an allocation of memory from a first application executing on the computing device; determine, based on the first request, an amount of memory and a memory attribute associated with the first request; send the request for the memory to the memory metadata service; receive a response from the memory metadata service that identifies an allocation of memory on a different computing device; and send a response to the first application.

Example 14 is the computing device of example 12 wherein a memory load operation of the first application causes a memory load request to be sent to the different computing device, and wherein the processor device is further to receive, from the different computing device, data stored at a location in memory of the different computing device referenced by the memory load request; and return the data to the first application.

Example 16 is a system comprising a first computing device comprising a first memory and a first processor device coupled to the first memory; and a second computing device comprising a second memory and a second processor device coupled to the second memory; wherein the first processor device is to receive, from the first computing device, a first memory allocation request that requests a first quantity of load-store memory; and send, to the first computing device, memory allocation information that identifies a first at least one sharable load-store memory segment based on the memory metadata repository.

Example 17 is the system of example 16 wherein the first processor device is further to obtain, by a memory metadata service executing on the first computing device, memory configuration information that identifies one or more sharable load-store memory segments available on each of a plurality of computing devices; and generate a memory metadata repository that comprises memory metadata that identifies, for each computing device of the plurality of computing devices, the one or more sharable load-store memory segments available on the computing device and, for each sharable load-store memory segment, a memory size of the sharable load-store memory segment.

Example 18 is the system of example 17 wherein the system further comprises a third computing device, and wherein the memory allocation information identifies the first at least one sharable load-store memory segment as being available on the third computing device.

Individuals will recognize improvements and modifications to the preferred examples of the disclosure. All such improvements and modifications are considered within the scope of the concepts disclosed herein and the claims that follow.

What is claimed is:

1. A method comprising:
    obtaining, by a memory metadata service executing on a computing device, memory configuration information that identifies one or more sharable load-store memory segments available on each of a plurality of computing devices, at least one sharable load-store memory segment of the one or more sharable load-store memory segments comprising a persistent load-store memory segment and another sharable load-store memory segment of the one or more sharable load-store memory segments comprising a volatile load-store memory segment;
    generating a memory metadata repository that comprises memory metadata that identifies, for each computing device of the plurality of computing devices, the one or more sharable load-store memory segments available on the computing device and, for each sharable load-store memory segment, a memory size of the sharable load-store memory segment and at least one memory attribute, wherein the at least one memory attribute comprises data indicative of a memory persistence capability of the sharable load-store memory segment that indicates whether the sharable load-store memory segment is a volatile load-store memory segment or a persistent load-store memory segment that is persistent over a power outage;
    receiving, from a first requesting computing device, a first memory allocation request that requests a first quantity of load-store memory with a requested memory attribute, wherein the requested memory attribute comprises the memory persistence capability indicating that the first quantity of load-store memory comprises a persistent load-store memory segment that is persistent over a power outage; and
    sending, to the first requesting computing device based on the memory metadata repository, memory allocation information that identifies a first sharable load-store memory segment with the requested memory attribute.

2. The method of claim 1 wherein obtaining the memory configuration information that identifies the one or more sharable load-store memory segments available on each of the plurality of computing devices comprises requesting, from each of the computing devices, the memory configuration information.

3. The method of claim 1 wherein obtaining the memory configuration information that identifies the one or more sharable load-store memory segments available on each of the plurality of computing devices comprises receiving, from each of the computing devices, an unsolicited message comprising the memory configuration information.

4. The method of claim 1 wherein the memory configuration information for a first computing device of the plurality of computing devices identifies a first sharable load-store memory segment as having a first memory size and a first memory attribute, and a second sharable load-store memory segment as having a second memory size and a second memory attribute that is different from the first memory attribute.

5. The method of claim 4 further comprising:
    storing in the memory metadata repository, for the first computing device, memory metadata that identifies the first sharable load-store memory segment as having the first memory size and the first memory attribute, and that identifies the second sharable load-store memory segment as having the second memory size and the second memory attribute.

6. The method of claim 5 wherein:
the at least one memory attribute further comprises data indicative of a memory speed capability of the sharable load-store memory segment; and
wherein the first memory attribute comprises the memory persistence capability of the first shareable load-store memory segment that identifies the first sharable load-store memory segment as being persistent over a power outage, and the second memory attribute comprises a memory speed capability that identifies the second sharable load-store memory segment as being a particular memory speed.

7. The method of claim 1 wherein the first memory allocation request identifies a requested amount of memory and the requested memory attribute, and wherein sending, to the first requesting computing device, the memory allocation information that identifies the first sharable load-store memory segment based on the memory metadata repository comprises:
determining, based on the memory metadata repository, that the first sharable load-store memory segment has an amount of available memory greater than or equal to the requested amount of memory, and that the first sharable load-store memory segment has the requested memory attribute.

8. The method of claim 1 wherein sending, to the first requesting computing device, the memory allocation information that identifies the first sharable load-store memory segment based on the memory metadata repository comprises sending, to the first requesting computing device, the memory allocation information that identifies the first sharable load-store memory segment on a first computing device of the plurality of computing devices, and that identifies a second sharable load-store memory segment on a second computing device of the plurality of computing devices.

9. The method of claim 1 wherein the first requesting computing device is a first computing device of the plurality of computing devices, and the first sharable load-store memory segment is available on a second computing device of the plurality of computing devices.

10. The method of claim 1 wherein the memory metadata repository is maintained in a storage medium that is persistent over a power outage.

11. The method of claim 1 further comprising modifying an available memory field that corresponds to the one or more sharable load-store memory segments to reduce the available memory field by the first quantity of load-store memory.

12. The method of claim 1 further comprising:
receiving, from the first requesting computing device, memory deallocation information that indicates that the first requesting computing device is no longer utilizing the one or more sharable load-store memory segments; and
in response to receiving the memory deallocation information, modifying an available memory field that corresponds to the one or more sharable load-store memory segments to increase the available memory field by the first quantity of load-store memory.

13. The method of claim 1 further comprising:
receiving, from a second requesting computing device, a second memory allocation request that requests a second quantity of load-store memory; and
sending, to the second requesting computing device, memory allocation information that identifies a second sharable load-store memory segment based on the memory metadata repository.

14. The method of claim 13 wherein the first sharable load-store memory segment is available on the second computing device and the second sharable load-store memory segment is available on the first computing device.

15. The method of claim 1 further comprising:
receiving, from the first requesting computing device, a second memory allocation request that requests a second quantity of load-store memory; and
sending, to the first requesting computing device, memory allocation information that identifies a second sharable load-store memory segment based on the memory metadata repository.

16. The method of claim 15 wherein the first sharable load-store memory segment is available on a first computing device of the plurality of computing devices and the second sharable load-store memory segment is available on a second computing device of the plurality of computing devices.

17. The method of claim 1 wherein the first memory allocation request is received via an application programming interface and the memory allocation information is sent via the application programming interface.

18. The method of claim 1, wherein generating the memory metadata repository comprises generating a memory metadata repository that comprises memory metadata that identifies, for each computing device of the plurality of computing devices, the one or more sharable load-store memory segments available on the computing device and, for each sharable load-store memory segment, the memory size of the sharable load-store memory segment and the at least one memory attribute, wherein the at least one memory attribute comprises data indicative of:
the memory persistence capability of the sharable load-store memory segment that indicates whether the sharable load-store memory segment is a volatile load-store memory segment or a persistent load-store memory segment that is persistent over a power outage; and
at least one of a data reduction capability of the sharable load-store memory segment or an encryption capability of the sharable load-store memory segment.

19. A computing device, comprising:
a memory; and
a processor device coupled to the memory to:
obtain, by a memory metadata service executing on the processor device, memory configuration information that identifies one or more sharable load-store memory segments available on each of a plurality of computing devices, at least one sharable load-store memory segment of the one or more sharable load-store memory segments comprising a persistent load-store memory segment that is persistent over a power outage and another sharable load-store memory segment of the one or more sharable load-store memory segments comprising a volatile load-store memory segment;
generate a memory metadata repository that comprises memory metadata that identifies, for each computing device of the plurality of computing devices, the one or more sharable load-store memory segments available on the computing device and, for each sharable load-store memory segment, a memory size of the sharable load-store memory segment and at least one memory attribute, wherein the at least one memory attribute comprises data indicative of a memory persistence capability of the sharable load-store memory segment that indicates whether the sharable load-store memory segment is a persistent load-store memory segment that is persistent over a power outage or a volatile load-store memory segment; and receive, from a first requesting computing device, a first memory allocation request that requests a first quantity of load-store memory with a requested memory attribute, wherein the requested memory attribute comprises the memory persistence capability indicating that the first quantity of load-store memory comprises a persistent load-store memory segment that is persistent over a power outage.

20. The computing device of claim 19 wherein the processor device is further to:

send, to the first requesting computing device, memory allocation information that identifies a first sharable load-store memory segment based on the memory metadata repository.

21. A computer program product stored on a non-transitory computer-readable storage medium and including instructions configured to cause a processor device to:

obtain, by a memory metadata service executing on the processor device, memory configuration information that identifies one or more sharable load-store memory segments available on each of a plurality of computing devices, at least one sharable load-store memory segment of the one or more sharable load-store memory segments comprising a persistent load-store memory segment and another sharable load-store memory segment of the one or more sharable load-store memory segments comprising a volatile load-store memory segment;

generate a memory metadata repository that comprises memory metadata that identifies, for each computing device of the plurality of computing devices, the one or more sharable load-store memory segments available on the computing device and, for each sharable load-store memory segment, a memory size of the sharable load-store memory segment and at least one memory attribute, wherein the at least one memory attribute comprises data indicative of a memory persistence capability of the sharable load-store memory segment that indicates whether the sharable load-store memory segment is a volatile load-store memory segment or a persistent load-store memory segment that is persistent over a power outage; and in response to receipt of a memory allocation request from a first requesting computing device that requests memory with a requested memory attribute comprising the memory persistence capability indicating that the memory is persistent load-store memory that is persistent over a power outage, send, to the first requesting computing device, memory allocation information that identifies a first sharable load-store memory segment based on the at least one memory attribute of the first sharable load-store memory segment.

* * * * *